United States Patent
Compton

(10) Patent No.: US 11,032,315 B2
(45) Date of Patent: Jun. 8, 2021

(54) DISTRIBUTED DENIAL-OF-SERVICE ATTACK MITIGATION WITH REDUCED LATENCY

(71) Applicant: Charter Communications Operating, LLC, St. Louis, MO (US)

(72) Inventor: Richard A. Compton, Highlands Ranch, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 270 days.

(21) Appl. No.: 15/880,522

(22) Filed: Jan. 25, 2018

(65) Prior Publication Data
US 2019/0230116 A1    Jul. 25, 2019

(51) Int. Cl.
*H04L 29/06* (2006.01)
*G06N 20/00* (2019.01)

(52) U.S. Cl.
CPC ......... *H04L 63/1458* (2013.01); *G06N 20/00* (2019.01); *H04L 63/1408* (2013.01); *H04L 63/20* (2013.01); *H04L 2463/141* (2013.01)

(58) Field of Classification Search
CPC .................................................. H04L 63/1458
See application file for complete search history.

(56) References Cited

U.S. PATENT DOCUMENTS

| | | | | |
|---|---|---|---|---|
| 7,788,718 B1* | 8/2010 | Fei | ...................... | H04L 63/1458 726/14 |
| 2003/0145232 A1* | 7/2003 | Poletto | ................ | H04L 63/1408 726/22 |
| 2006/0272018 A1* | 11/2006 | Fouant | ................ | H04L 63/1416 726/23 |
| 2011/0191847 A1* | 8/2011 | Davis | ...................... | G06F 15/16 726/22 |
| 2015/0312273 A1* | 10/2015 | Pappu | ................ | H04L 63/1416 726/23 |

(Continued)

OTHER PUBLICATIONS

"Defeating DDoS Attacks," White Paper, Cisco Systems, Inc., 2004, pp. 1-11.

(Continued)

*Primary Examiner* — Simon P Kanaan
(74) *Attorney, Agent, or Firm* — Otterstedt, Wallace & Kammer, LLP

(57) ABSTRACT

An apparatus for mitigating a DDoS attack in a networked computing system includes at least one detector coupled with a corresponding router in the networked computing system. The detector is configured: to obtain network flow information from the router regarding current data traffic to at least one host; to compare the current data traffic to the host with stored traffic patterns associated with at least one prior DDoS attack; and to generate an output indicative of a match between the current data traffic and at least one of the stored traffic patterns. The apparatus further includes at least one mitigation unit coupled with the at least one detector. The mitigation unit is configured: to receive the output indicative of the match between the current data traffic and at least one of the stored traffic patterns; and to initiate a DDoS attack mitigation action in response to the received output.

20 Claims, 6 Drawing Sheets

(56) References Cited

U.S. PATENT DOCUMENTS

2016/0036837 A1\* 2/2016 Jain .................... H04L 63/1416
                                                        726/23
2017/0279835 A1\* 9/2017 Di Pietro ............. H04L 63/145
2018/0152466 A1\* 5/2018 Sartran ............... H04L 63/1425

OTHER PUBLICATIONS

Linda Musthaler, "Best Practices to Mitigate DDoS Attacks," Network World, IDG Communications, Inc., Jan. 2013, pp. 1-4.

\* cited by examiner

DISTRIBUTED DENIAL-OF-SERVICE ATTACK MITIGATION WITH REDUCED LATENCY

FIELD OF THE INVENTION

The present invention relates generally to the electrical, electronic and computer arts, and, more particularly, to mitigation of distributed denial-of-service attacks in a networked computing environment.

BACKGROUND OF THE INVENTION

In the context of computing, a denial-of-service (DoS) attack is an attempt to make a machine or network resource unavailable to its intended users. A distributed denial-of-service (DDoS) attack is an attack in which multiple compromised computer systems attack a target resource, such as a server, router, firewall, website, or other network resource, and cause a denial of service for users of the targeted resource. A flood of incoming messages, connection requests, malformed data packets and the like creates a stream of bogus traffic which, when transmitted to the target system, forces it to slow down or even crash and shut down. Since a server or other network resource can only process a limited number of requests at any given time, if an attacker overloads the target resource with requests, it can't process the requests of its legitimate users, thereby resulting in a "denial of service" because the users are prevented from accessing that resource.

Two common types of DDoS attacks are bandwidth attacks and application attacks. Bandwidth attacks are DDoS attacks which consume resources such as network bandwidth or equipment by overwhelming one or the other (or both) with a high volume of packets. Targeted routers, servers and firewalls, all of which have limited processing capability, can be rendered unavailable to process valid transactions, and can fail under the load. One common form of bandwidth attack is a packet-flooding attack, in which a large number of seemingly legitimate Transmission Control Protocol (TCP), User Datagram Protocol (UDP), Internet Control Message Protocol (ICMP) and/or other protocol IP packets are directed to a target destination, thus filling up the available bandwidth to the target and preventing valid connections from being established. To make detection even more difficult, such attacks might also spoof the source address; that is, misrepresent the Internet Protocol (IP) source address that supposedly generated the request to prevent identification. Application attacks, on the other hand, are DDoS attacks that use the expected behavior of protocols, such as, for example, TCP and Hypertext Transfer Protocol (HTTP), to an attacker's advantage by tying up computational resources and preventing them from processing transactions or requests. HTTP half-open and HTTP error attacks are common examples of application attacks.

Since DDoS attacks are by definition distributed, it can be very difficult to mitigate attack traffic when the attacking source IP addresses are so widespread. Furthermore, a growing trend among DDoS attackers is to use sophisticated spoofing techniques and essential protocols (rather than nonessential protocols that can be blocked) to make DDoS attacks even more stealthy and disruptive. These attacks, which use legitimate application protocols and services, are very difficult to identify and defeat; employing broad packet-filtering or rate-limiting measures simply completes the attacker's desired objective by shutting down the system, causing denial of service to legitimate users.

SUMMARY OF THE INVENTION

The present invention, in one or more embodiments, comprises a method and apparatus for mitigating distributed denial-of-service (DDoS) attack traffic by proactively initiating a mitigation process prior to detection of an actual DDoS attack. One or more aspects of the invention, according to illustrative embodiments thereof, involve comparing current data traffic to each host with historical pre-DDoS traffic patterns and then determines whether to initiate mitigation based on whether the current traffic matches the historical pre-DDoS traffic patterns. In this manner, embodiments of the invention beneficially reduces an inherent latency between the occurrence of an actual DDoS attack and detection of the attack, and furthermore between the occurrence of the DDoS attack and its mitigation.

An exemplary apparatus for mitigating a DDoS attack in a networked computing system, according to an aspect of the invention, includes at least one detector in operative communication with a corresponding router in the networked computing system. The detector is configured: to obtain network flow information from the router regarding current data traffic to at least one host; to compare the current data traffic to the at least one host with stored traffic patterns associated with at least one prior DDoS attack; and to generate an output indicative of a match between the current data traffic and at least one of the stored traffic patterns. The apparatus further includes at least one mitigation unit in operative communication with the at least one detector. The mitigation unit is configured: to receive the output indicative of the match between the current data traffic and at least one of the stored traffic patterns; and to initiate at least one DDoS attack mitigation action in response to the received output.

In another aspect, an exemplary method of mitigating a DDoS attack in a networked computing system includes: receiving network traffic flow information from a router in the networked computing system regarding current data traffic to at least one host; comparing the current data traffic to the at least one host with stored traffic patterns associated with at least one prior DDoS attack; generating an output signal indicative of a match between the current data traffic and at least one of the stored traffic patterns; and initiating at least one DDoS attack mitigation action in response to the received output signal.

In yet another aspect, an exemplary non-transitory computer readable medium includes computer executable instructions which when executed by a computer cause the computer to perform a method of: receiving network traffic flow information from a router in a networked computing system regarding current data traffic to at least one host; comparing the current data traffic to the at least one host with stored traffic patterns associated with at least one prior DDoS attack; generating an output signal indicative of a match between the current data traffic and at least one of the stored traffic patterns; and initiating at least one DDoS attack mitigation action in response to the received output signal.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

Various units, circuits, modules, or other components may be described herein as being "configured to" perform a particular task or tasks. In such contexts, the term "configured to" is intended to be construed broadly as a recitation of structure generally meaning "having circuitry that" performs the task or tasks during operation. As such, the unit/circuit/module/component can be configured to perform the subject task or tasks even when the unit/circuit/module/component/is not currently powered on. In general, circuitry that forms the structure corresponding to "configured to" may include hardware circuits and/or memory storing program instructions executable to implement the operation. Similarly, various units/circuits/modules/components may be described as performing a task or tasks, for convenience in the description. Such descriptions should be interpreted as including the phrase "configured to." Reciting a unit/circuit/module/component that is configured to perform one or more tasks is expressly intended not to invoke a 35 U.S.C. § 112, paragraph (f) interpretation for that unit/circuit/module/component.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., an Internet Service Provider (ISP) peering router, data center, DDoS mitigation device, etc.) including memory and at least one processor that is coupled to the memory and operative to perform, or to facilitate the performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention achieve one or more of:
  reducing latency between when an actual DDoS attack starts and initiation of the DDoS attack mitigation process;
  utilizing historical information regarding pre-DDoS attack traffic patterns to enhance the accuracy of predicting the occurrence of a DDoS attack and thereby reduce the likelihood of false enabling of DDoS mitigation;
  implementation of the novel DDoS mitigation techniques can be easily integrated with existing system hardware, thereby providing a more robust DDoS mitigation mechanism without significantly increasing system overhead and complexity.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Principles of the present disclosure will be described herein in the context of apparatus and methods for mitigating distributed denial-of-service (DDoS) attacks in a networked computing environment in such a manner as to eliminate, or at least reduce, an inherent latency between the occurrence of an actual DDoS attack and mitigation of the DDoS attack. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

As previously stated, DDoS attacks are by definition distributed, and therefore it can be very difficult to accurately detect and mitigate attack traffic when the attacking source Internet Protocol (IP) addresses are so widespread. Furthermore, a growing trend among DDoS attackers is to utilize sophisticated spoofing techniques and essential protocols to make DDoS attacks even more stealthy and disruptive. These attacks, which use legitimate application protocols and services, are very difficult to identify and defeat.

Figure 1:
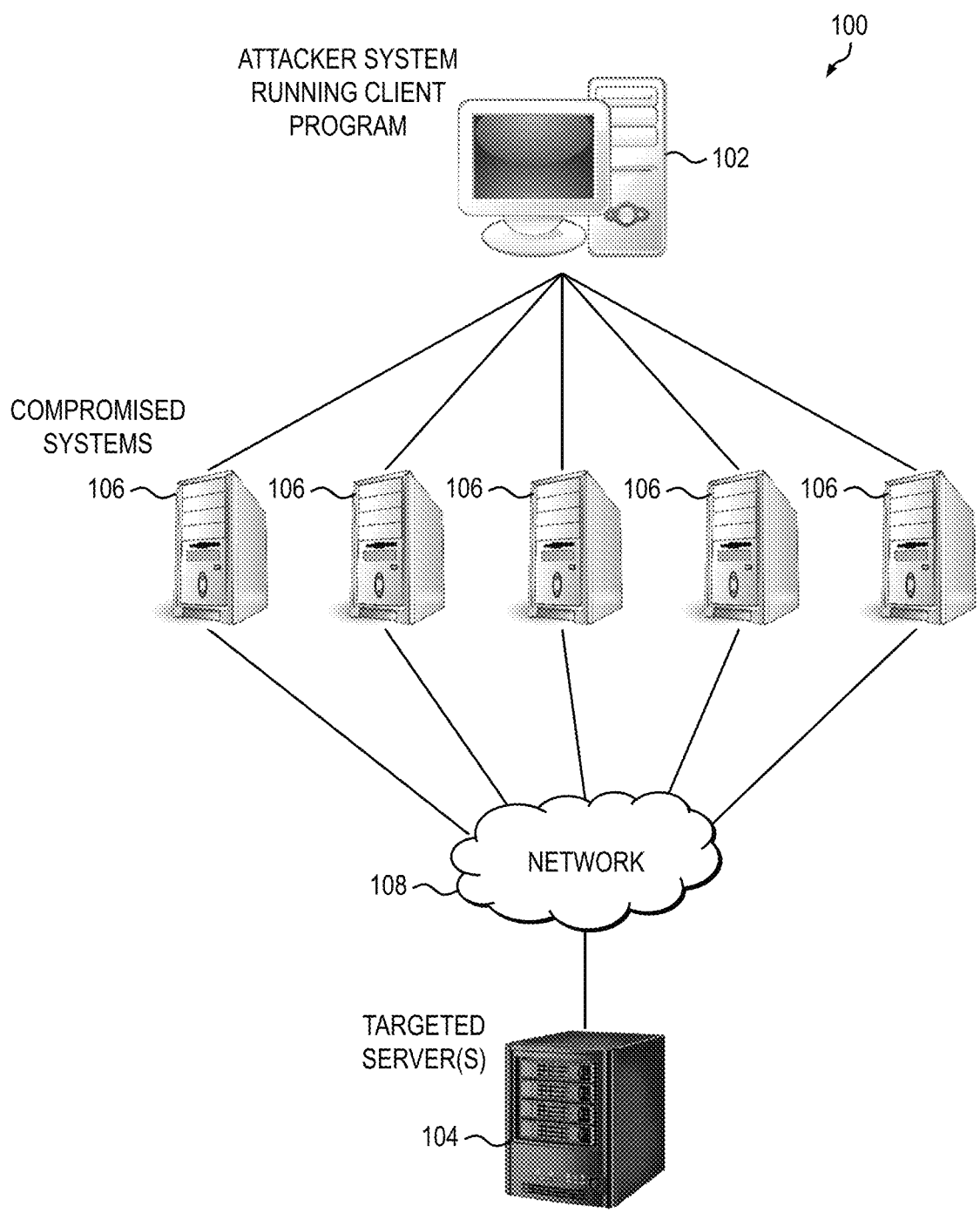
FIG. 1 is a block diagram conceptually depicting the occurrence of a distributed denial-of-service (DDoS) attack in an exemplary networked computing system.

FIG. 1 is a block diagram conceptually depicting the occurrence of a DDoS attack in an exemplary networked computing system 100. In a typical DDoS attack, an attacker system 102 running a client program seeks to make a targeted system 104, often one or more Web servers, unavailable to its intended users. Denial of service is typically accomplished by the attacker system 102 flooding the targeted system 104 with superfluous requests or other malicious traffic via multiple compromised computer systems 106 connected with the targeted system in a distributed manner through a network 108, such as the Internet. The incoming traffic flooding the targeted system 104 in a DDoS attack originates from many different sources (e.g., compromised systems 106), thereby making it effectively impossible to stop the attack simply by blocking a single source.

The terms "network traffic," or "data traffic," or simply "traffic," as may be used interchangeably herein, are intended to broadly refer to the amount of data moving across a network at a given point in time. From a computing standpoint, network data in computer networks is most typically encapsulated in data packets, which provide the load in the network.

Conventionally, there are two primary methods of mitigating DDoS attacks. A first approach is to leave mitigation turned on continuously, such as by passing all traffic through a mitigation appliance, regardless of whether a DDoS attack has started or is even anticipated. This approach, while essentially eliminating the need for DDoS detection overhead, consumes significant system resources; if mitigation is turned on and there is no DDoS attack (as is frequently the case), there may not be sufficient resources available to mitigate an actual DDoS attack.

Consider, for example, an Internet Service Provider (ISP) which utilizes DDoS mitigation devices (e.g., TMS devices, in the context of an Arbor Networks appliance) that can support about 100 to 150 concurrent mitigations. By turning on mitigation for one customer that never receives a DDoS attack, there is one less mitigation resource available for a customer who is actually experiencing a DDoS attack when all resources are full.

A second approach is to only turn on mitigation when a DDoS attack is detected; this approach is most common. This detection-based DDoS mitigation mechanism conserves mitigation resources compared to the first approach. However, any mitigation mechanism based on DDoS detection will inherently exhibit latency, since DDoS detection, by design, assumes that the DDoS attack has already begun before mitigation is turned on. More particularly, there is a potentially lengthy inherent latency between when a DDoS attack starts and its detection, and even further latency in starting a mitigation process once the DDoS attack has been detected. During this period of time, there can be an outage for the customer, which is undesirable.

As a novel hybrid approach which eliminates or at least reduces this DDoS attack mitigation latency while conserving valuable DDoS attack mitigation resources, one or more embodiments of the invention advantageously provide a DDoS attack mitigation mechanism which passively identifies the type of traffic (e.g., by monitoring traffic patterns) sent to a destination IP address and compares this traffic with pre-DDoS attack traffic patterns that have historically been associated with a DDoS attack, and then enables mitigation for that destination IP if a match is found in anticipation of the destination IP receiving an actual DDoS attack; that is, enablement of DDoS attack mitigation, in one or more embodiments, is not based on detection of a DDoS attack, but rather is based on identification of traffic patterns that have historically been associated with actual DDoS attacks. Thus, a DDoS attack mitigation scheme according to one or more embodiments of the invention is able to make an educated prediction that there will be an imminent DDoS attack, before any actual DDoS attack detection occurs (i.e., prior to detection of an actual DDoS attack). By proactively initiating mitigation prior to detection of an actual DDoS attack, mitigation latency is essentially eliminated, since detection traditionally indicates that an attack has already happened.

Figure 2:
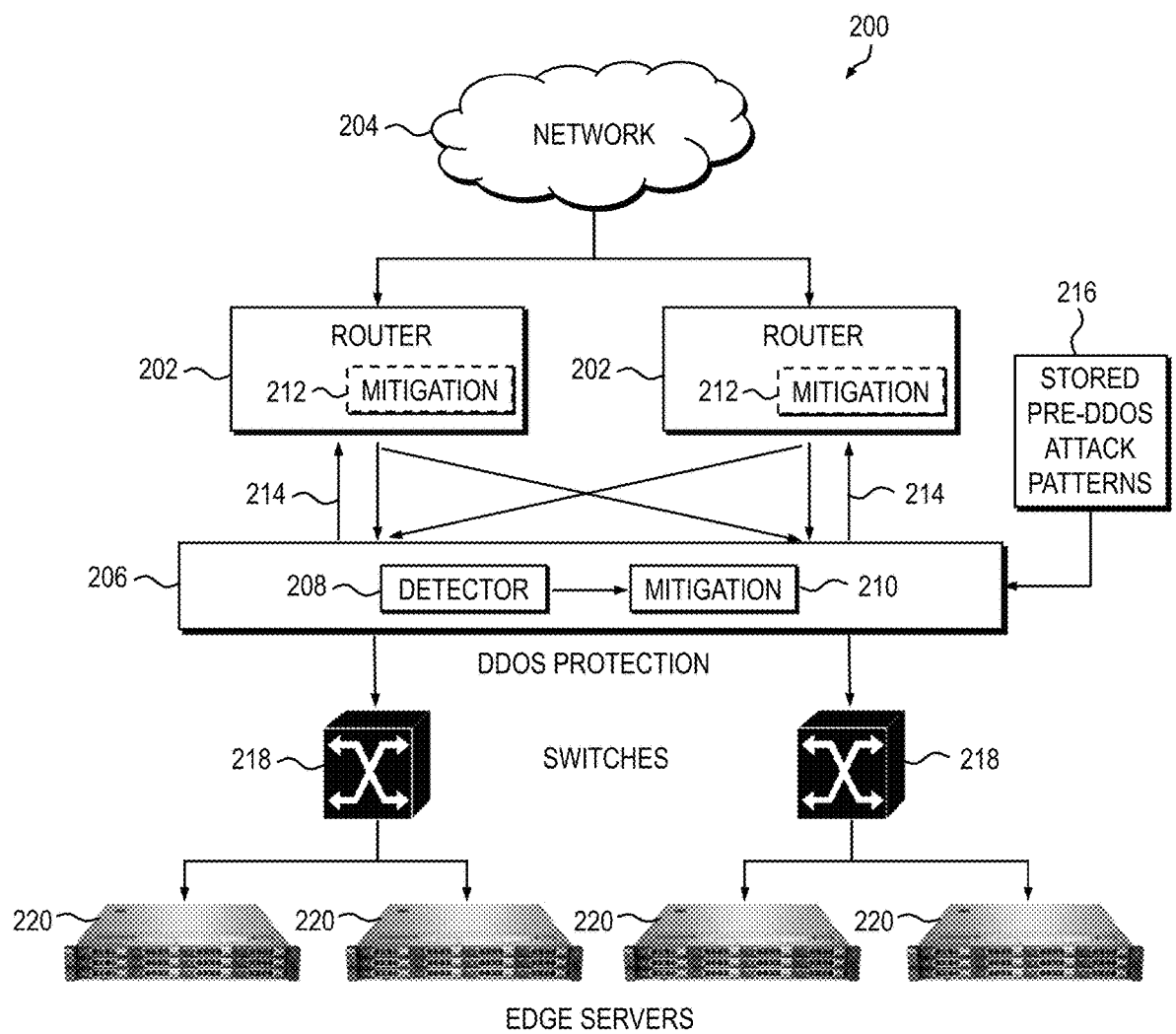
FIG. 2 is a block diagram depicting at least a portion of an exemplary apparatus 200 for mitigating DDoS attacks with reduced latency in a networked computing system, according to an embodiment of the present invention.

FIG. 2 is a block diagram depicting at least a portion of an exemplary apparatus 200 for mitigating DDoS attacks with reduced latency in a networked computing system, according to an embodiment of the invention. As shown in FIG. 2, the DDoS mitigation apparatus 200 includes one or more routers 202 operatively coupled with a network 204 (e.g., the Internet), and at least one DDoS protection device 206 operatively coupled with the routers 202. The DDoS protection device 206 preferably includes at least one DDoS detection unit (Detector) 208 and at least one DDoS mitigation unit 210 operative to mitigate DDoS attacks with reduced latency, as will be described in further detail herein below. Optionally, in one or more embodiments, at least a portion of the DDoS mitigation functionality may be implemented by a DDoS mitigation unit 212 residing externally to the DDoS protection device 206, such as in a corresponding router 202. In this embodiment, information from the DDoS protection device 206 may be sent to the routers 202 via a connection 214 between the DDoS protection device and at least a subset of the routers 202 for facilitating the performance of a DDoS mitigation action.

The routers 202 are configured to receive requests or other traffic from the network 204 with which the router is operatively coupled (e.g., in wired or wireless communication therewith). In one or more embodiments, each of at least a subset of the routers 202 is configured to characterize network operation by collecting IP network traffic flow information as the traffic enters or exits an interface or network node, such as, for example, using NetFlow (a product of Cisco Systems, Inc.) or the like. By analyzing the data provided by NetFlow, a network administrator can determine information relating to the operational status of the network, such as, but not limited to, the source and destination of traffic, class of service, and the causes of congestion. In order to characterize network operation, the routers 202, in one or more embodiments, are configured to aggregate packets into flows and to export flow records, to receive, store and pre-process the flow records, and to analyze the received flow data in the context of intrusion detection and/or traffic profiling, for example. At least a subset of the network traffic flow information is then passed to the DDoS protection device 206 where the traffic flow is monitored at least for the presence of pre-DDoS attack traffic patterns.

In one or more embodiments, DDoS attack traffic patterns obtained from previous IP sessions that preceded a DDoS attack, which may be referred to herein as "pre-DDoS" attack patterns, are stored in a database or other storage unit 216. These stored pre-DDoS attack patterns are used by the DDoS protection device 206 to predict the likelihood of a future imminent DDoS attack on a destination IP device, or to a destination IP address, which exhibits traffic patterns matching at least one of the stored pre-DDoS attack patterns.

Once a match is determined, DDoS mitigation is enabled prior to the actual occurrence of the DDoS attack.

Output traffic from the DDoS protection device 206 is sent to one or more switches 218 coupled to the DDoS protection device which route traffic to edge servers 220 coupled with the switches. The edge servers 220, in a system administration context, are servers that reside on the "edge" between two networks, typically a private network and the Internet 204, and support multimedia communications with external users.

As previously stated, one or more aspects of the invention eliminate or reduce the latency of implementing DDoS mitigation by identifying suspicious traffic before a DDoS attack starts. There are multiple ways to identify suspicious traffic according to embodiments of the invention. For example, in one or more embodiments, information about the type of traffic associated with a previous DDoS attack or attacks is stored, such as in a database (e.g., database 216 in FIG. 2) or alternative storage unit. In one or more embodiments, a machine learning mechanism is employed which inspects traffic patterns prior to DDoS attacks and then develops a prediction model to estimate the likelihood of a future DDoS attack. Once a customer is identified as being the likely target of a DDoS attack, based on information collected from the customer and the prediction model, DDoS mitigation is turned on to mitigate the attack before it begins.

Figure 3:
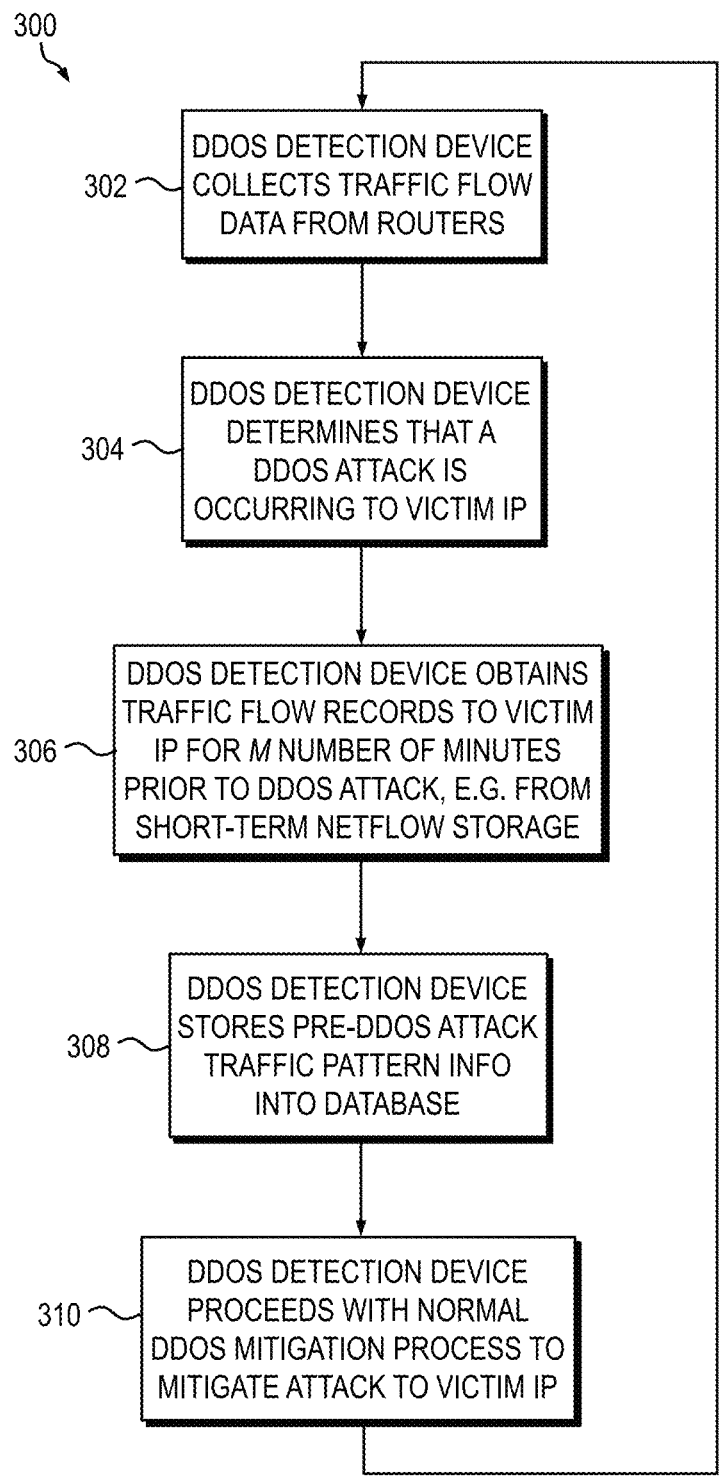
FIG. 3 is a flow diagram depicting at least a portion of an exemplary method for recording DDoS attack traffic patterns associated with prior actual DDoS attacks, according to an embodiment of the present invention.

With reference now to FIG. 3, at least a portion of an exemplary method 300 is depicted for recording DDoS traffic patterns associated with prior actual DDoS attacks, according to an embodiment of the invention. A DDoS detection device (e.g., detector 208 in FIG. 2) collects IP traffic flow information (e.g., NetFlow records) from the routers (e.g., routers 202 in FIG. 2) in step 302. In one or more embodiments, virtual appliances called "collectors" are used which gather the traffic flow records from the routers; the traffic flow records describe information about the traffic. For example, NetFlow records may indicate that traffic was transmitted from a given source IP address to a given destination IP address from a prescribed port to a prescribed port, that there were p number of packets that were transmitted, and x number of bytes were transferred, where p and x are integers. Using this information collected in step 302, a DDoS detection device determines that a DDoS attack is occurring to a victim IP address in step 304.

In step 306, the DDoS detection device obtains traffic flow records to the victim IP address for a prescribed number, M, of minutes prior to the DDoS attack; this information can be obtained from short-term NetFlow storage, for example. Thus, the collectors, in one or more embodiments, are configured to gather the type(s) of traffic patterns immediately preceding the DDoS attack in step 306. The DDoS detection device stores the pre-DDoS attack traffic pattern information into a database (e.g., database 216 in FIG. 2) or alternative storage element in step 308. In step 310, the DDoS detection device proceeds with a normal DDoS mitigation process to mitigate the DDoS attack to the victim IP address and process flow returns to step 302 to repeat the method 300 for recording DDoS traffic patterns associated with prior actual DDoS attacks. These stored pre-DDoS attack traffic patterns are utilized by a DDoS protection device (e.g., 206 in FIG. 2) to predict a DDoS attack to a potential DDoS victim IP and to start DDoS attack mitigation.

Figure 4:
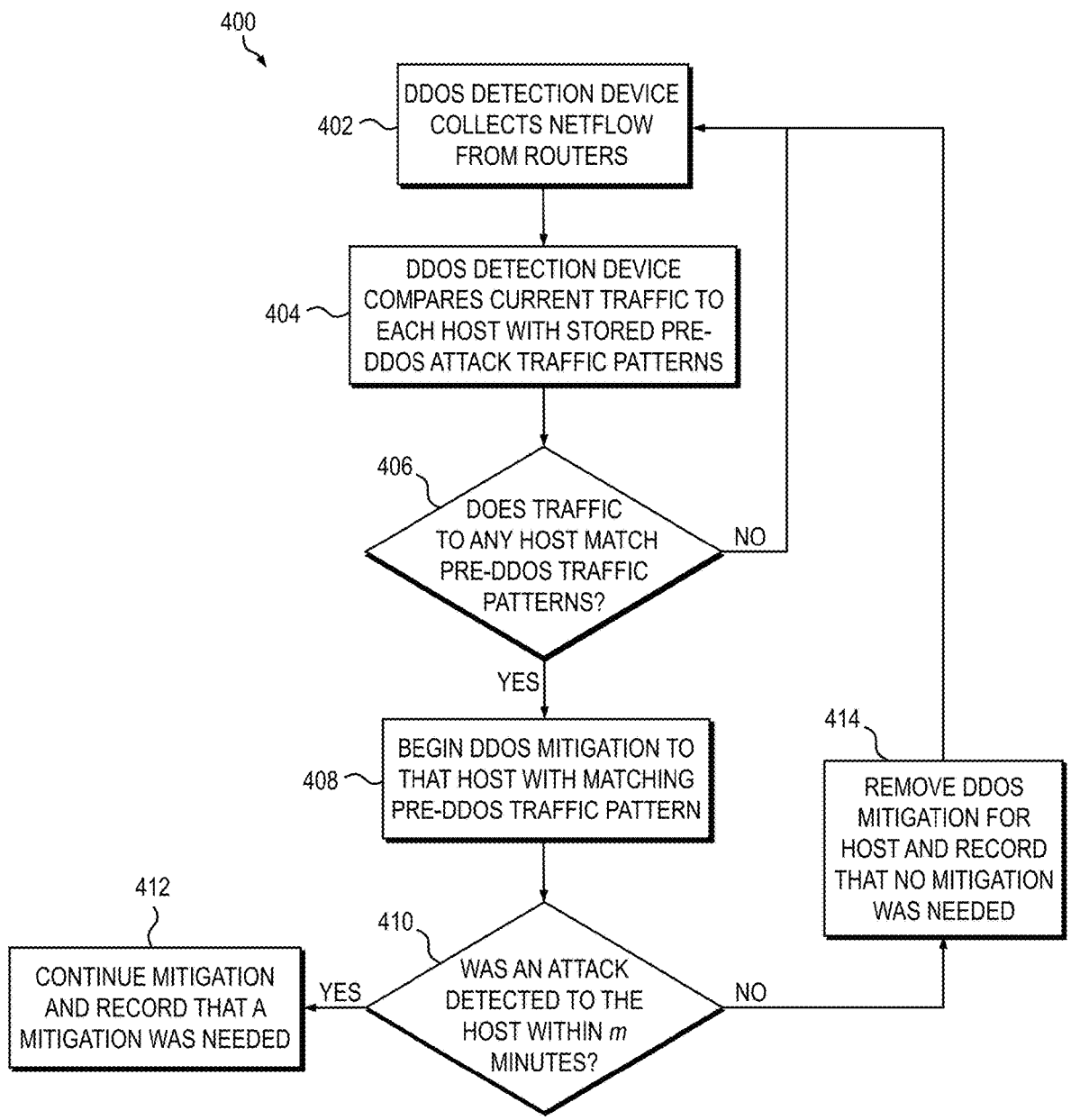
FIG. 4 is a flow diagram depicting at least a portion of an exemplary method for predicting a DDoS attack to a potential DDoS victim Internet Protocol (IP) address and for starting DDoS attack mitigation prior to the occurrence of an actual DDoS attack, according to an embodiment of the present invention.

More particularly, FIG. 4 is a flow diagram depicting at least a portion of an exemplary method 400 for predicting a DDoS attack to a potential DDoS victim IP address and for initiating DDoS attack mitigation prior to the start of an actual DDoS attack, according to an embodiment of the invention. With reference to FIG. 4, the method 400 includes a DDoS detection device (e.g., 208 in FIG. 2) collecting network traffic flow information (e.g., NetFlow data or the like) from one or more corresponding routers (e.g., 202 in FIG. 2) in step 402. The DDoS detection device compares the current traffic (i.e., for a current networking session) to each host with stored pre-DDoS attack traffic patterns in step 404. In one or more embodiments, the pre-DDoS attack traffic patterns may be obtained in a manner consistent with the illustrative method 300 for recording DDoS attack traffic patterns associated with prior actual DDoS attacks previously described and shown in FIG. 3.

In step 406, the DDoS detection device determines whether the current traffic to any host matches the stored pre-DDoS attack traffic patterns associated with prior actual DDoS attacks. If the current traffic to any host does not match one or more stored pre-DDoS attack traffic patterns, the method 400 reverts to step 402 where the DDoS detection device continues to collect network traffic flow information from the routers and the process is repeated. Alternatively, if the current traffic to any host does match one or more stored pre-DDoS attack traffic patterns, the method 400 proceeds to step 408 where one or more DDoS attack mitigation actions are implemented (i.e., enabled or activated) for that host exhibiting the matching pre-DDoS attack traffic pattern. The mitigation action, in one or more embodiments, is performed by one or more mitigation devices (e.g., 210 in FIG. 2).

In the event that DDoS attack mitigation is enabled and no actual DDoS attack occurs, it is beneficial to turn off mitigation to conserve system resources. Accordingly, step 410 checks to see whether, after DDoS attack mitigation was started in step 408, an actual DDoS attack to the host was detected within a prescribed period of time (e.g., within m minutes). If a DDoS attack to that host was detected, DDoS attack mitigation continues in step 412. Optionally, step 412 records that a DDoS attack mitigation was needed, for example by updating the historical database of pre-DDoS attack patterns, since an actual DDoS attack occurred. Conversely, if no DDoS attack was detected, the method 400 removes (i.e., turns off or disables) DDoS attack mitigation for that host in step 414. Optionally, step 414 records that DDoS attack mitigation was not needed, for example by updating the historical database of pre-DDoS attack patterns, since an actual DDoS attack did not occur. This updating of the historical database of pre-DDoS attack patterns in steps 412 and 414 may be helpful to improve the accuracy of the prediction model used to forecast the likelihood of a future DDoS attack so as to avoid enabling DDoS attack mitigation unnecessarily.

Embodiments of the invention contemplate various mechanisms and actions for mitigating DDoS attacks. For example, in one or more embodiments, the DDoS attack mitigation performed in step 408 may involve diverting traffic originating from a high-risk IP source to a DDoS mitigation device (e.g., mitigation unit 210 residing in the DDoS protection device 206, or mitigation unit 212 residing in a corresponding router 202, as shown in FIG. 2). The DDoS mitigation device may be implemented in whole or in part in hardware (e.g., a controller, not explicitly shown but implied, resident in the mitigation unit 210 of FIG. 2), or as an application or module running on the hardware in the networked computing system. DDoS attack mitigation actions which may be performed by the mitigation device may include, but are not limited to, rate-limiting the traffic, discarding packets from the traffic, either randomly or in some defined manner, proxying the connection from the sender to the victim, presenting a challenge to the sender, and/or performing deep packet inspection (DPI) on all or a subset of the packets constituting the malicious traffic flow, as will become apparent to those skilled in the art given the teachings herein. In a challenge-based mechanism (e.g., challenge-response authentication), the DDoS mitigation device, in one or more embodiments, automatically sends a challenge, such as, for example, some JavaScript, to the (alleged) sender/client of the incoming traffic identified as suspicious. If the client is a valid browser, then it has no problem running the JavaScript and the mitigation device whitelists that client. Alternatively, if the client cannot run the JavaScript, it is assumed to be an attacker and is blacklisted.

In one or more embodiments, the DDoS mitigation device (e.g., 210 in FIG. 2) and router (e.g., 202 in FIG. 2) may be in communication with one another, such as via a connection therebetween (e.g., connection 214 in FIG. 2). By way of example only and without limitation, a controller in the DDoS mitigation device, based on pre-DDoS attack patterns obtained from a database (e.g., 216 in FIG. 2) or other storage element, may determine that a DDoS attack is about to occur and send a message or other control signal to the router instructing the router to handle all traffic from the originating IP host differently from normal IP traffic, including, but not limited to, rate-limiting the traffic, diverting the traffic to a different path (e.g., by changing a next-hop IP address in BGP) for performing DPI or another analysis mechanism on the malicious traffic, discarding packets, etc.

Figure 5:
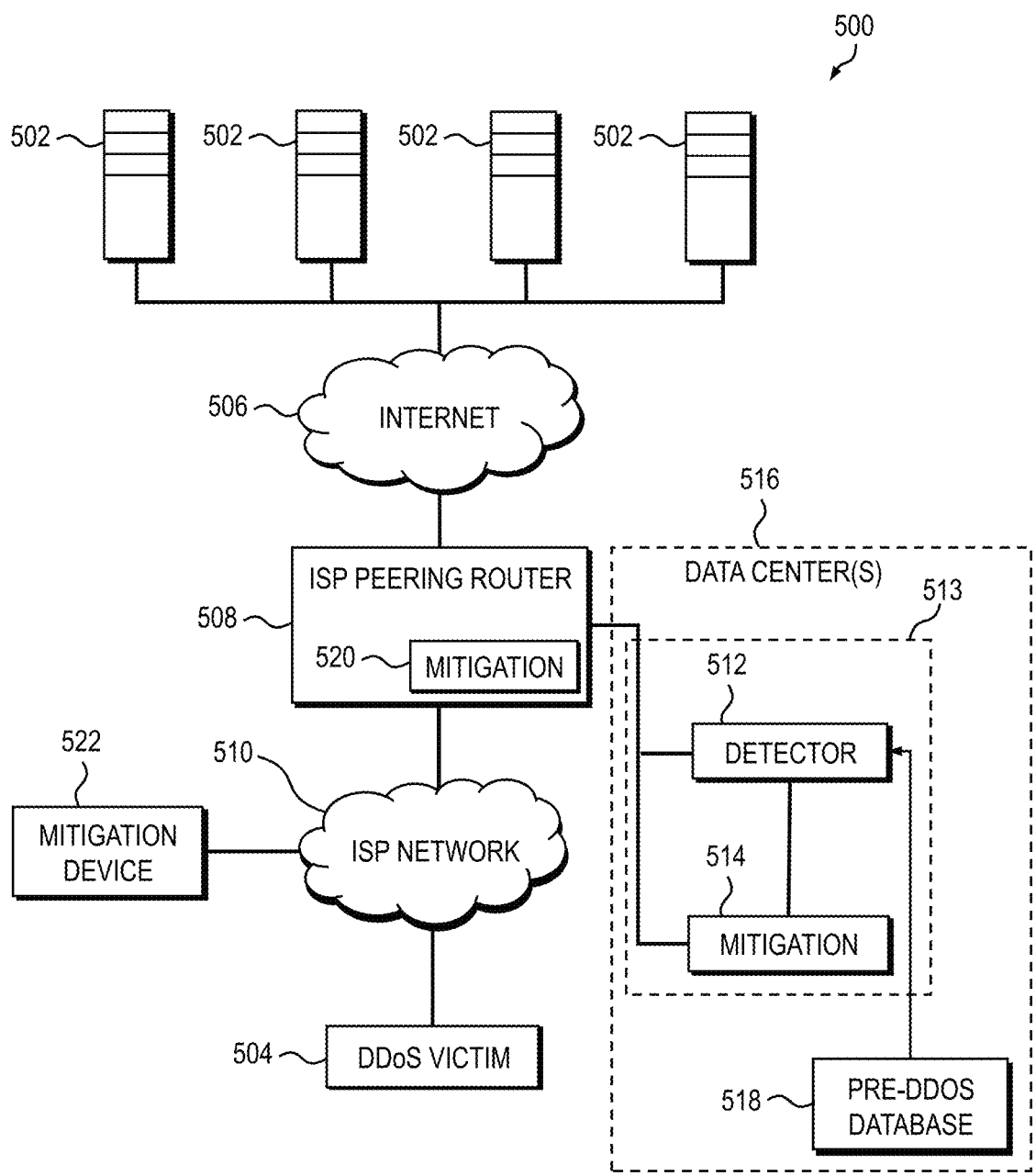
FIG. 5 is a block diagram depicting at least a portion of an exemplary networked computing system in which DDoS mitigation techniques in accordance with one or more embodiments of the present invention are implemented.

FIG. 5 is a block diagram depicting at least a portion of an exemplary networked computing system 500 in which DDoS mitigation techniques in accordance with one or more embodiments of the invention may be implemented. As shown in FIG. 5, the system 500 includes a plurality of attacker systems 502 operating in a distributed manner to flood (and thereby overwhelm) a targeted victim system 504 with superfluous requests or other malicious traffic through at least one network 506, such as the Internet. The superfluous traffic is channeled through a router 508, which may be an Internet Service Provider (ISP) peering router or the like. The term "peering" as used herein is intended to refer broadly to an arrangement of traffic exchange between two or more ISPs; larger ISPs with their own backbone networks agree to allow traffic from other large ISPs in exchange for traffic on their backbones. They also exchange traffic with smaller ISPs, such as, for example, ISP network 510, so that they can reach regional end points.

Peering requires the exchange and updating of router information between the peered ISPs, typically using Border Gateway Protocol (BGP) or another suitable communication protocol. Generally, peering parties interconnect at network focal points, such as, for example, network access points (NAPs) in the United States and at regional switching points. Each major ISP generally develops a peering policy that states the terms and conditions under which it will peer with other networks for various types of traffic.

The ISP peering router 508 may be implemented in a manner consistent with the illustrative router 202 previously described in conjunction with FIG. 2. In this embodiment, the peering router 508 is in operative communication with the ISP network 510. The peering router 508, in one or more embodiments, is configured to control traffic between the Internet 506 and the ISP network 510, generally via one or more BGP sessions (or suitable alternative communications protocols) established between the router and the Internet 506 and/or ISP network 510.

In a manner consistent with the illustrative embodiment shown in FIG. 2, the peering router 508 is operatively coupled with a detector 512 of a DDoS protection device 513, which may be implemented in a manner consistent with the illustrative detector 208 depicted in FIG. 2, and a mitigation unit 514, which may be implemented in a manner consistent with the illustrative mitigation unit 210 shown in FIG. 2. The detector 512 is also operatively coupled with the mitigation unit 514. At least portions of the DDoS protection device 513 (e.g., detector 512 and/or mitigation unit 514), in one or more embodiments, are incorporated within at least one data center 516 (e.g., a national data center (NDC) and/or a regional data center (RDC)) in communication with the peering router 508.

In this embodiment, like the exemplary embodiment of FIG. 2, the detector 512 is configured to collect network traffic flow information (e.g., NetFlow data, or the like) from the peering router 508. The detector 512 preferably compares the current traffic to each host with pre-DDoS attack traffic patterns, which may be stored in a database 518 or similar storage unit coupled with the detector. In one or more embodiments, the pre-DDoS attack traffic patterns may be obtained in a manner consistent with the illustrative method for recording DDoS attack traffic patterns associated with prior actual DDoS attacks previously described and shown in conjunction with FIG. 3. When the detector 512 determines that the current traffic matches one or more stored pre-DDoS attack traffic patterns in the database 518, the detector, in one or more embodiments, is operative to send a control signal to the mitigation unit 514 for determining an appropriate DDoS attack mitigation course of action.

The mitigation unit 514 may incorporate a controller therein configured to generate a mitigation output signal (e.g., control and/or command signal) which is supplied to the peering router 508. The peering router 508 may include a second mitigation device 520 which is adapted to receive the output signal from the mitigation unit 514 and to perform one or more actions in response thereto for mitigating an anticipated DDoS attack prior to detecting an actual DDoS attack. The mitigation device 520 may be a separate device or an application or module running on the peering router 508 itself. DDoS attack mitigation actions which may be performed by the mitigation device 520 may include, but are not limited to, rate-limiting the traffic, discarding packets from the traffic, either randomly or in some defined manner, proxying the connection from the sender to the victim, presenting a challenge (e.g., JavaScript) or other authentication action to the sender, and/or performing DPI on all or a subset of the packets constituting the anticipated malicious traffic flow.

In one or more embodiments, a third mitigation device 522 may be included which is operatively coupled with the ISP network 510. The mitigation device 522, which may be in addition to or in place of either mitigation devices 514 and/or 520, is configured to receive one or more control signals from the DDoS protection device 513, via the router 508, through the ISP network 510 for performing one or more DDoS mitigation actions in response thereto. For example, in one or more embodiments, the mitigation device 520 in the peering router 508, in response to a control signal generated by the DDoS protection device 513, may be configured to perform a first set of actions such as, but not limited to, rate-limiting the traffic or discarding packets from the traffic. The router 508 may redirect a flow of potentially malicious traffic to the third mitigation device 522, with the third mitigation device being configured to perform DPI on all or a subset of the packets constituting the predicted malicious traffic flow.

Given the discussion thus far, it will be appreciated that, in general terms, an exemplary apparatus for mitigating a DDoS attack in a networked computing system, according to an aspect of the invention, includes at least one detector in operative communication with a corresponding router in the networked computing system. The detector is configured: to obtain network flow information from the router regarding current data traffic to at least one host; to compare the current data traffic to the at least one host with stored traffic patterns associated with at least one prior DDoS attack; and to generate an output indicative of a match between the current data traffic and at least one of the stored traffic patterns. The apparatus further includes at least one mitigation unit in operative communication with the at least one detector. The mitigation unit is configured: to receive the output indicative of the match between the current data traffic and at least one of the stored traffic patterns; and to initiate at least one DDoS attack mitigation action in response to the received output.

Given the discussion thus far, it will be appreciated that, in general terms, an exemplary method for mitigating a DDoS attack in a networked computing system includes: receiving network traffic flow information from a router in the networked computing system regarding current data traffic to at least one host; comparing the current data traffic to the at least one host with stored traffic patterns associated with at least one prior DDoS attack; generating an output signal indicative of a match between the current data traffic and at least one of the stored traffic patterns; and initiating at least one DDoS attack mitigation action in response to the received output signal.

Given the discussion thus far, it will be further appreciated that, in general terms, an exemplary non-transitory computer readable medium includes computer executable instructions which when executed by a computer cause the computer to perform a method of: receiving network traffic flow information from a router in a networked computing system regarding current data traffic to at least one host; comparing the current data traffic to the at least one host with stored traffic patterns associated with at least one prior DDoS attack; generating an output signal indicative of a match between the current data traffic and at least one of the stored traffic patterns; and initiating at least one DDoS attack mitigation action in response to the received output signal.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 6:
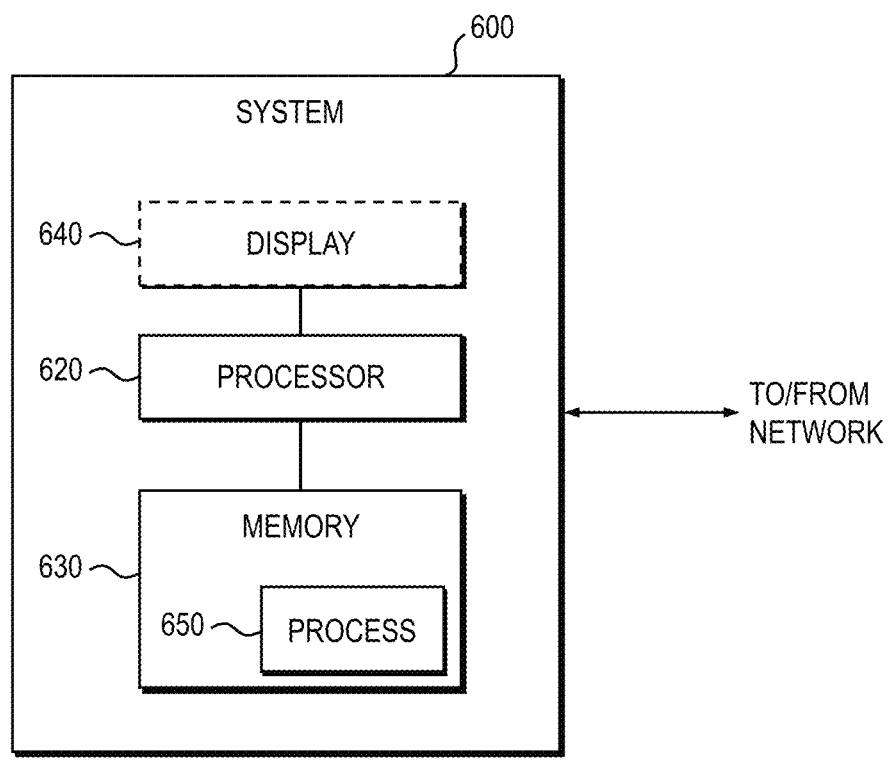
FIG. 6 is a block diagram of at least a portion of an exemplary system that can be configured to implement at least some aspects of the invention, according to one or more embodiments of the present invention.

FIG. 6 is a block diagram of at least a portion of an exemplary system 600 that can be configured to implement at least some aspects of the invention, and is representative, for example, of one or more of the apparatus or modules shown in the figures. As shown in FIG. 6, memory 630 configures the processor 620 to implement one or more methods, steps, and functions (collectively, shown as process 650 in FIG. 6). The memory 630 could be distributed or local and the processor 620 could be distributed or singular. Different steps could be carried out by different processors, either concurrently (i.e., in parallel) or sequentially (i.e., in series).

The memory 630 could be implemented as an electrical, magnetic or optical memory, or any combination of these or other types of storage devices. It should be noted that if distributed processors are employed, each distributed processor that makes up processor 620 generally contains its own addressable memory space. It should also be noted that some or all of computer system 600 can be incorporated into an application-specific or general-use integrated circuit. For example, one or more method steps could be implemented in hardware in an ASIC rather than using firmware—an ASIC chip could be used to initiate a fusible link blowout. Display 640 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An apparatus for mitigating a distributed denial-of-service (DDoS) attack in a networked computing system, the apparatus comprising:

at least one detector in operative communication with a corresponding router in the networked computing system, the at least one detector being configured: to obtain network traffic flow information from the router regarding current data traffic to at least one host; to employ a machine learning mechanism to inspect one or more traffic patterns prior to the DDoS attack and develop a prediction model to estimate a likelihood of a future DDoS attack; to compare the current data traffic to at least one of the one or more traffic patterns associated with at least one prior DDoS attack stored in the at least one host in response to a prediction of the DDoS attack, each traffic pattern characterizing network traffic flow over a predefined period of time; and to generate an output indicative of a match between the current data traffic and at least one of the stored traffic patterns; and at least one mitigation unit in operative communication with the at least one detector, the at least one mitigation unit being configured: to receive the output indicative of the match between the current data traffic and at least one of the stored traffic patterns; and to initiate at least one DDoS attack mitigation action in response to the received output prior to detection of an actual DDoS attack to the at least one host.

2. The apparatus of claim 1, wherein the at least one mitigation unit is further configured: to monitor the current data traffic for at least a prescribed period of time after initiation of the at least one DDoS attack mitigation action; to determine whether an actual DDoS attack to the at least one host has occurred within the prescribed period of time; to continue implementing the at least one DDoS attack mitigation action when it is determined that a DDoS attack has occurred within the prescribed period of time; and to disable the at least one DDoS attack mitigation action when it is determined that a DDoS attack to the at least one host has not occurred within the prescribed period of time.

3. The apparatus of claim 2, wherein the at least one mitigation unit is further configured to record that a DDoS attack mitigation action was needed when it is determined that a DDoS attack has occurred within the prescribed period of time.

4. The apparatus of claim 2, wherein the at least one mitigation unit is further configured to record that a DDoS attack mitigation action was not needed when it is determined that a DDoS attack has not occurred within the prescribed period of time.

5. The apparatus of claim 1, wherein the at least one detector is further configured: to monitor network information from the router regarding data traffic from a prior networking session; to determine that a DDoS attack has occurred to at least one victim Internet Protocol (IP) address; to obtain from the router network traffic flow records to the victim IP address for a prescribed amount of time prior to the DDoS attack; to store pre-DDoS attack traffic patterns.

6. The apparatus of claim 5, wherein the at least one detector is further configured to generate the prediction model for estimating the likelihood of the future DDoS attack as a function of the stored pre-DDoS attack traffic patterns, the output generated by the at least one detector being based at least in part on the prediction model.

7. The apparatus of claim 1, wherein the at least one mitigation unit is further configured: to monitor the current data traffic for at least a prescribed period of time after initiation of the at least one DDoS attack mitigation action; to record that a DDoS attack mitigation action was not needed when it is determined that a DDoS attack has not occurred within the prescribed period of time and to record that a DDoS attack mitigation action was needed when it is determined that an actual DDoS attack has occurred within the prescribed period of time; and wherein the at least one detector is configured to update the prediction model based on recorded information regarding whether or not the DDoS attack mitigation was needed to thereby enhance an accuracy of the prediction model.

8. The apparatus of claim 1, wherein the traffic patterns associated with at least one prior DDoS attack are stored in a database in operative communication with the at least one detector.

9. The apparatus of claim 1, wherein the at least one DDoS attack mitigation action initiated by the at least one mitigation unit comprises at least one of rate-limiting the current data traffic, discarding packets from the current data traffic, proxying a connection from a sender to a victim, presenting a challenge to the sender, and performing deep packet inspection on at least a subset of packets in the current data traffic constituting malicious traffic flow.

10. A method for mitigating a distributed denial-of-service (DDoS) attack in a networked computing system, the method comprising:
  receiving network traffic flow information from a router in the networked computing system regarding current data traffic to at least one host;
  employing a machine learning mechanism to inspect one or more traffic patterns prior to the DDoS attack and develop a prediction model to estimate a likelihood of a future DDoS attack;
  comparing the current data traffic to at least one of the one or more traffic patterns associated with at least one prior DDoS attack stored in the at least one host in response to a prediction of the DDoS attack, each traffic pattern characterizing network traffic flow over a predefined period of time;
  generating an output signal indicative of a match between the current data traffic and at least one of the stored traffic patterns; and
  initiating at least one DDoS attack mitigation action in response to the received output signal prior to detection of an actual DDoS attack to the at least one host.

11. The method of claim 10, further comprising:
  monitoring the current data traffic for at least a prescribed period of time after initiation of the at least one DDoS attack mitigation action;
  determining whether an actual DDoS attack to the at least one host has occurred within the prescribed period of time;
  continuing to implement the at least one DDoS attack mitigation action when it is determined that a DDoS attack has occurred within the prescribed period of time; and
  disabling the at least one DDoS attack mitigation action when it is determined that a DDoS attack to the at least one host has not occurred within the prescribed period of time.

12. The method of claim 11, further comprising recording that a DDoS attack mitigation action was needed when it is determined that a DDoS attack has occurred within the prescribed period of time.

13. The method of claim 11, further comprising recording that a DDoS attack mitigation action was not needed when it is determined that a DDoS attack has not occurred within the prescribed period of time.

14. The method of claim 10, further comprising:
  monitoring network information from the router regarding data traffic from a prior networking session;
  determining whether a DDoS attack has occurred to at least one victim Internet Protocol (IP) address;
  when it is determined that a DDoS attack has occurred to the at least one victim IP address, receiving from the router network traffic flow records to the victim IP address for a prescribed amount of time prior to the DDoS attack; and
  storing pre-DDoS attack traffic patterns.

15. The method of claim 14, further comprising generating the prediction model for estimating the likelihood of the future DDoS attack as a function of the stored pre-DDoS attack traffic patterns, the output signal being generated as a function of the prediction model.

16. The method of claim 10, further comprising:
  monitoring the current data traffic for at least a prescribed period of time after initiation of the at least one DDoS attack mitigation action;
  recording that a DDoS attack mitigation action was not needed when it is determined that a DDoS attack has not occurred within the prescribed period of time;
  recording that a DDoS attack mitigation action was needed when it is determined that an actual DDoS attack has occurred within the prescribed period of time; and
  updating the prediction model based on recorded information regarding whether or not the DDoS attack mitigation was needed to thereby enhance an accuracy of the prediction model.

17. The method of claim 10, wherein initiating the at least one DDoS attack mitigation action comprises at least one of rate-limiting the current data traffic, discarding packets from the current data traffic, proxying a connection from a sender to a victim, presenting a challenge to the sender, and performing deep packet inspection on at least a subset of packets in the current data traffic constituting malicious traffic flow.

18. A non-transitory computer readable medium comprising computer executable instructions which when executed by a computer cause the computer to perform a method of:
  receiving network traffic flow information from a router in a networked computing system regarding current data traffic to at least one host;
  employing a machine learning mechanism to inspect one or more traffic patterns prior to the DDoS attack and develop a prediction model to estimate a likelihood of a future DDoS attack;
  comparing the current data traffic to at least one of the one or more traffic patterns associated with at least one prior DDoS attack stored in the at least one host in response to a prediction of the DDoS attack, each traffic pattern characterizing network traffic flow over a predefined period of time;
  generating an output signal indicative of a match between the current data traffic and at least one of the stored traffic patterns; and
  initiating at least one DDoS attack mitigation action in response to the received output signal.

19. The apparatus of claim 1, the apparatus further comprising short-term NetFlow storage, the at least one detector being configured to obtain one or more traffic flow records to a victim IP address for at least one minute prior to the DDoS attack, wherein the one or more traffic flow records are obtained from the short-term NetFlow storage.

20. The method of claim 10, the method further comprising obtaining one or more traffic flow records to a victim IP address for at least one minute prior to the DDoS attack, wherein the one or more traffic flow records are obtained from short-term NetFlow storage.

* * * * *